US012745753B1

(12) United States Patent
Wang

(10) Patent No.: US 12,745,753 B1
(45) Date of Patent: Sep. 29, 2026

(54) PET CHASING TOY

(71) Applicant: Ying Wang, Shanghai (CN)

(72) Inventor: Ying Wang, Shanghai (CN)

( * ) Notice: Subject to any disclaimer, the term of this patent is extended or adjusted under 35 U.S.C. 154(b) by 0 days.

(21) Appl. No.: 19/376,851

(22) Filed: Oct. 31, 2025

(30) Foreign Application Priority Data

| | | |
|---|---|---|
| Oct. 27, 2025 | (CN) | 202511545288.5 |
| Oct. 27, 2025 | (CN) | 202522273126.2 |

(51) Int. Cl.
*A01K 15/02* (2006.01)

(52) U.S. Cl.
CPC ................................ *A01K 15/0257* (2025.08)

(58) Field of Classification Search
CPC ..... A01K 15/02; B65H 75/4476; A63H 21/02
USPC .......................................... 242/388.9, 388.91
See application file for complete search history.

(56) References Cited

U.S. PATENT DOCUMENTS

| | | | | |
|---|---|---|---|---|
| 3,405,478 A * | 10/1968 | Richter | A63H 21/02 | |
| 3,693,290 A * | 9/1972 | Breslow | A63H 11/10 | 46/202 |
| 5,367,232 A * | 11/1994 | Netherton | H02P 7/14 | 318/3 |
| 12,324,416 B1 * | 6/2025 | Pan | A01K 15/02 | |
| 2015/0201586 A1 * | 7/2015 | Wolfgram | A01K 15/02 | |

* cited by examiner

*Primary Examiner* — Joshua J Michener
*Assistant Examiner* — Henry Hooper Mudd
(74) *Attorney, Agent, or Firm* — Tsz Lung Yeung

(57) ABSTRACT

A pet chasing toy includes a main driving station, at least one satellite unit which is arranged to be disposed at a distance from the main driving station, a connecting cable and a visual object attached on the connecting cable. The main driving station includes a driving unit and a main driving rotor. The satellite unit includes a satellite driving wheel. The connecting cable extends between the main driving rotor and the satellite driving wheel. The driving unit is arranged to drive the main driving rotor to rotate so as to drive the connecting cable and the visual object to repetitively move between the main driving rotor and the satellite driving wheel.

11 Claims, 15 Drawing Sheets

PET CHASING TOY

CROSS REFERENCE TO RELATED APPLICATION

This is a non-provisional application which claims priority to a Chinese patent application having an application number of 2025115452885, and a filing date of Oct. 27, 2025, and another Chinese patent application having an application number of 2025222731262, and a filing date of Oct. 27, 2025, the entire contents of which is hereby incorporated by reference.

BACKGROUND OF THE PRESENT INVENTION

Field of Invention

The present invention relates to a pet toy, and more particularly to a pet chasing toy which encourages a pet to chase and mimic prey.

Description of Related Arts

Pet toys, such as a motorized self-moving toy for pets, is very popular among pet owners. A conventional pet toy usually comprises a movable unit, a lure unit, and a connecting cable extending between the movable unit and the lure unit. The movable unit is arranged to station on a ground surface as driven by a motor so as to drive the connecting cable and the lure unit to move as well.

The conventional pet toy such as the one described above usually employ a closed loop structure which prevents the connecting cable from detaching from the movable unit when the pet toy is being played by a pet such as a cat. However, this structure also prevents the pet owner from visually observing the movable unit, and easily causes the lure unit or the connecting cable from entangling with the movable unit. This conventional structure is not aesthetically appealing and may increase manufacturing costs.

Therefore, there is a need to develop a pet toy in which the internal structure may be visually observable from outside of the toy and at the same time reduce the manufacturing cost of the pet toy.

SUMMARY OF THE PRESENT INVENTION

Certain variations of the present invention provide a pet chasing toy which mimics prey and encourages a pet to chase for fun.

Certain variations of the present invention provide a pet chasing toy which comprises a main driving unit and a plurality of satellite units, wherein these units are connected by a connecting cable for forming different chasing configurations for the pet.

Certain variations of the present invention provide a pet chasing toy, comprising:

a main driving station comprising a driving unit and a main driving rotor, wherein the driving unit is arranged to drive the main driving rotor to rotate;

at least one satellite unit which is arranged to be disposed at a distance from the main driving station, the satellite unit comprising a satellite driving wheel;

a connecting cable extending between the main driving rotor and the satellite driving wheel; and a visual object attached to the connecting cable, wherein the driving unit is arranged to drive the main driving rotor to rotate so as to drive the connecting cable and the visual object to repetitively move between the main driving rotor and the satellite driving wheel.

This summary presented above is provided merely to introduce certain concepts and not to identify any key or essential features of the claimed subject matter.

DETAILED DESCRIPTION OF THE PREFERRED EMBODIMENT

Figure 1:
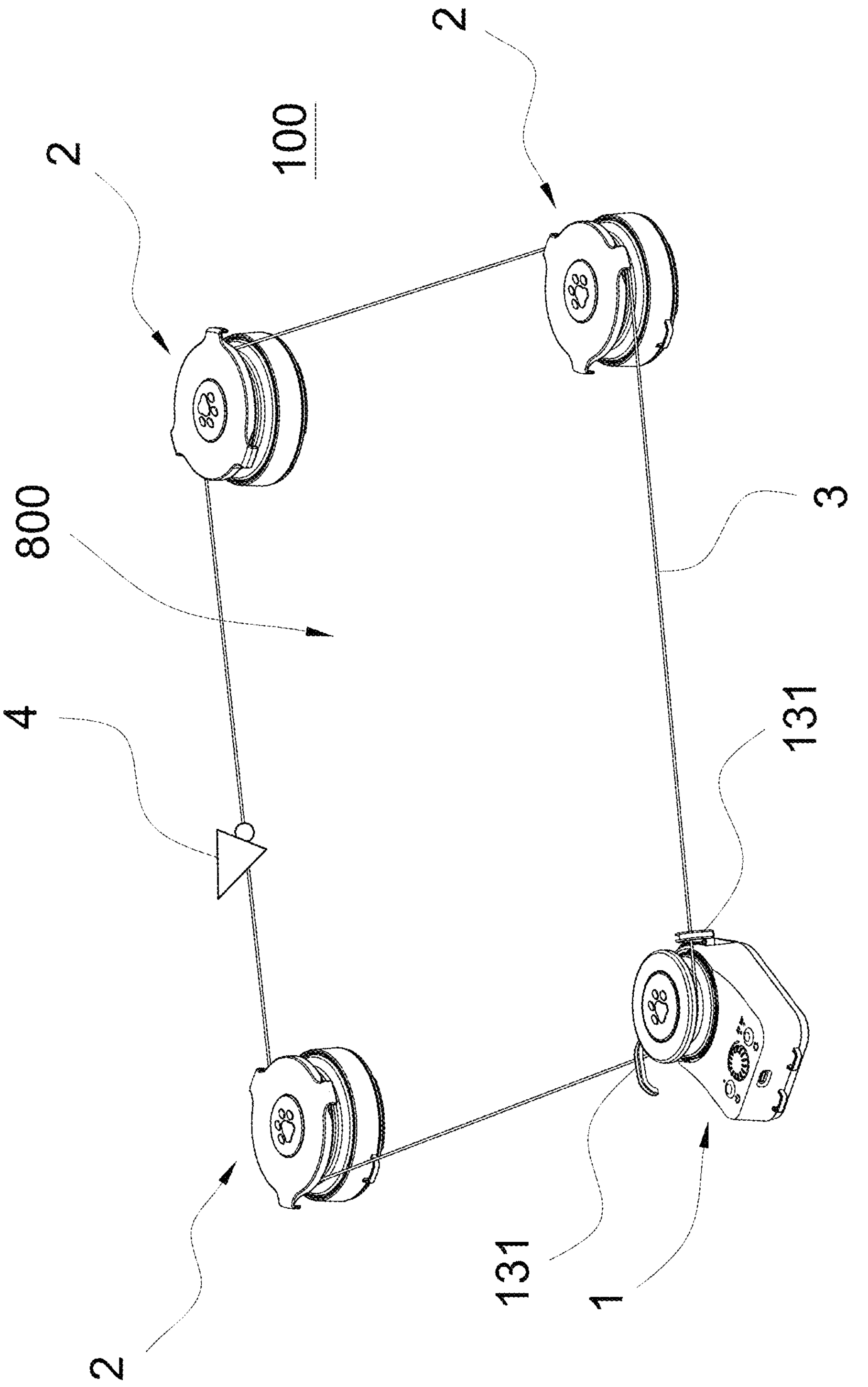
FIG. 1 is a schematic diagram of a pet chasing toy according to a preferred embodiment of the present invention, illustrating that a main driving station and three satellite units may be positioned to form a rectangular configuration.

The following detailed description of the preferred embodiment is the preferred mode of carrying out the invention. The description is not to be taken in any limiting sense. It is presented for the purpose of illustrating the general principles of the present invention.

In the following descriptions, it should also be appreciated that the terms "arrange" and "set" in the following description refer to the connecting relationship in the accompanying drawings for easy understanding of the present invention. For example, the "arrange" and "set" may refer to one element directly or indirectly set or arrange on another element. Therefore, the above terms should not be an actual connection limitation of the elements of the present invention.

It should also be appreciated that the terms "center", "length", "width", "thickness", "top", "bottom", "front", "rear", "left", "right", vertical", "horizontal", "upper", "lower", "interior", and "exterior" in the following description refer to the orientation or positioning relationship in the accompanying drawings for easy understanding of the present invention without limiting the actual location or orientation of the present invention. Therefore, the above terms should not be an actual location limitation of the elements of the present invention.

Moreover, it should be appreciated that the terms "first", "second", "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

It should be appreciated that the terms "install", "connect", "couple", and "mount" in the following description refer to the connecting relationship in the accompanying drawings for easy understanding of the present invention. For example, the connection may refer to permanent connection or detachable connection. Therefore, the above terms should not be an actual connection limitation of the elements of the present invention.

As shown in FIG. 1 to FIG. 15 of the drawings, a pet chasing toy 100 according to a preferred embodiment of the present invention is illustrated. Broadly, the pet chasing toy may comprise a main driving station 1, at least one satellite unit 2, a connecting cable 3, and a visual object 4.

The main driving station 1 may comprise a driving unit 133 and a main driving rotor 12, wherein the driving unit 133 may be arranged to drive the main driving rotor 12 to operate.

The satellite unit 2 may be arranged to be disposed at a distance from the main driving station 1, and may comprise a satellite driving wheel 22.

The connecting cable 3 may movably extend between the main driving rotor 12 and the satellite driving wheel 21.

The visual object 4 may be attached to the connecting cable 3, wherein the driving unit 133 is arranged to drive the main driving rotor 12 to rotate so as to drive the connecting cable 3 and the visual object 4 to repetitively move between the main driving rotor 12 and the satellite driving wheel 22.

According to the preferred embodiment of the present invention, the pet chasing toy 100 of the present invention may be utilized for mimicking prey in domestic environment and may be played by a pet, such as a cat or a dog. The pet chasing toy may comprise a plurality of satellite units 2 which may be connected by the connecting cable 3. The visual object 4 may be detachably attached to the connecting cable 3 so that it may travel between each two adjacent satellite units 2 through the connecting cable 3. Thus, by strategically positioning the satellite units 2 around the main driving station 1, the pet chasing toy may form a system of chasing loop 800 so that the pet may devote itself into prey fantasy within the system.

Figure 2:
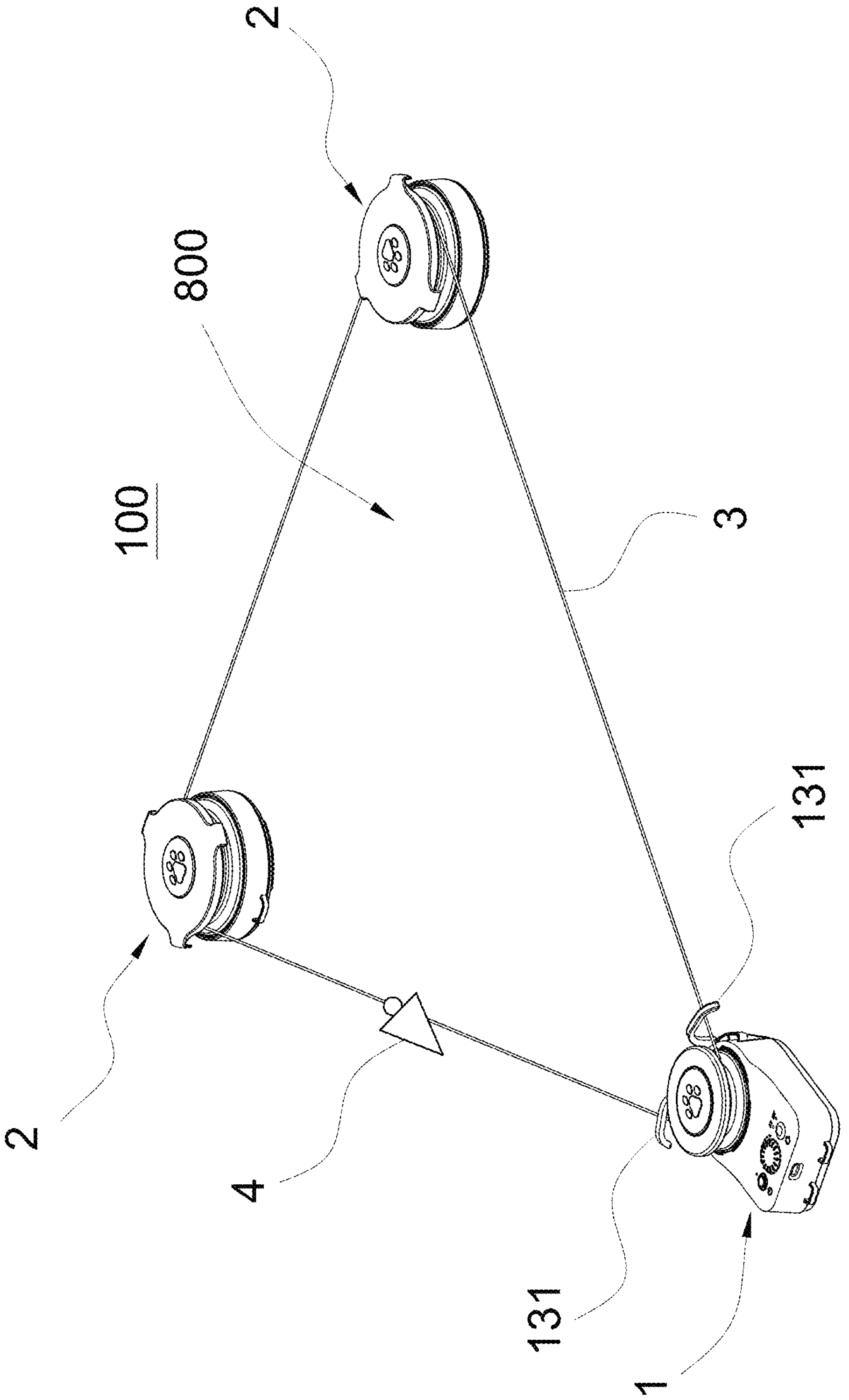
FIG. 2 is a schematic diagram of a pet chasing toy according to the preferred embodiment of the present invention, illustrating that a main driving station and three satellite units may be positioned to form a triangular configuration.

Referring to FIG. 1 of the drawings, as an exemplary configuration, the pet chasing toy 100 may comprise a main driving station 1 and three satellite units 2. They may be positioned to form a rectangular chasing loop 800. The main driving station 1 and three satellite units 2 may be connected by the connecting cable 3 to which the visual object 4 may be attached. In this preferred embodiment, the connecting cable 3 may be arranged to surround the main driving station 1 and the three satellite units 2. In other words, the main driving station 1 and the three satellite units 2 may be positioned within the chasing loop 800 formed by the connecting cable 3. The main driving station 1 and the three satellite units 2 may be positioned to form a rectangular configuration. Alternatively, as shown in FIG. 2 of the drawings, the main driving station 1 and the three satellite units 2 may be positioned to form a triangular configuration. Yet another variation of the present invention may be illustrated in FIG. 3 and FIG. 4 of the drawings, in which a main driving station 1 and one satellite unit 2 may be positioned to form another chasing configuration.

It is important to emphasize that the number of satellite units 2 and their positions with respect to the main driving station 1 may be varied depending on manufacturing circumstances, or freely selected or designed by a user of the present invention. The number of chasing configurations and satellite units 2 are not limiting within the scope of the present invention.

The visual object 4 may be selected from a wide variety of objects. The goal is to attract the pet and let it chase. For example, the visual object may comprise feathers, a ribbon, a bug-like object or other suitable objects. The visual object 4 may be configured to be light-reflective, or even generate smell, illumination and/or sound by electrical components. The visual object 4 may be made by light material so that it may conveniently and quickly travel with the connecting cable 3.

The connecting elastic 3 may be configured as an elastic string which is durable and rigid enough to carry the visual object 4.

Figure 5:
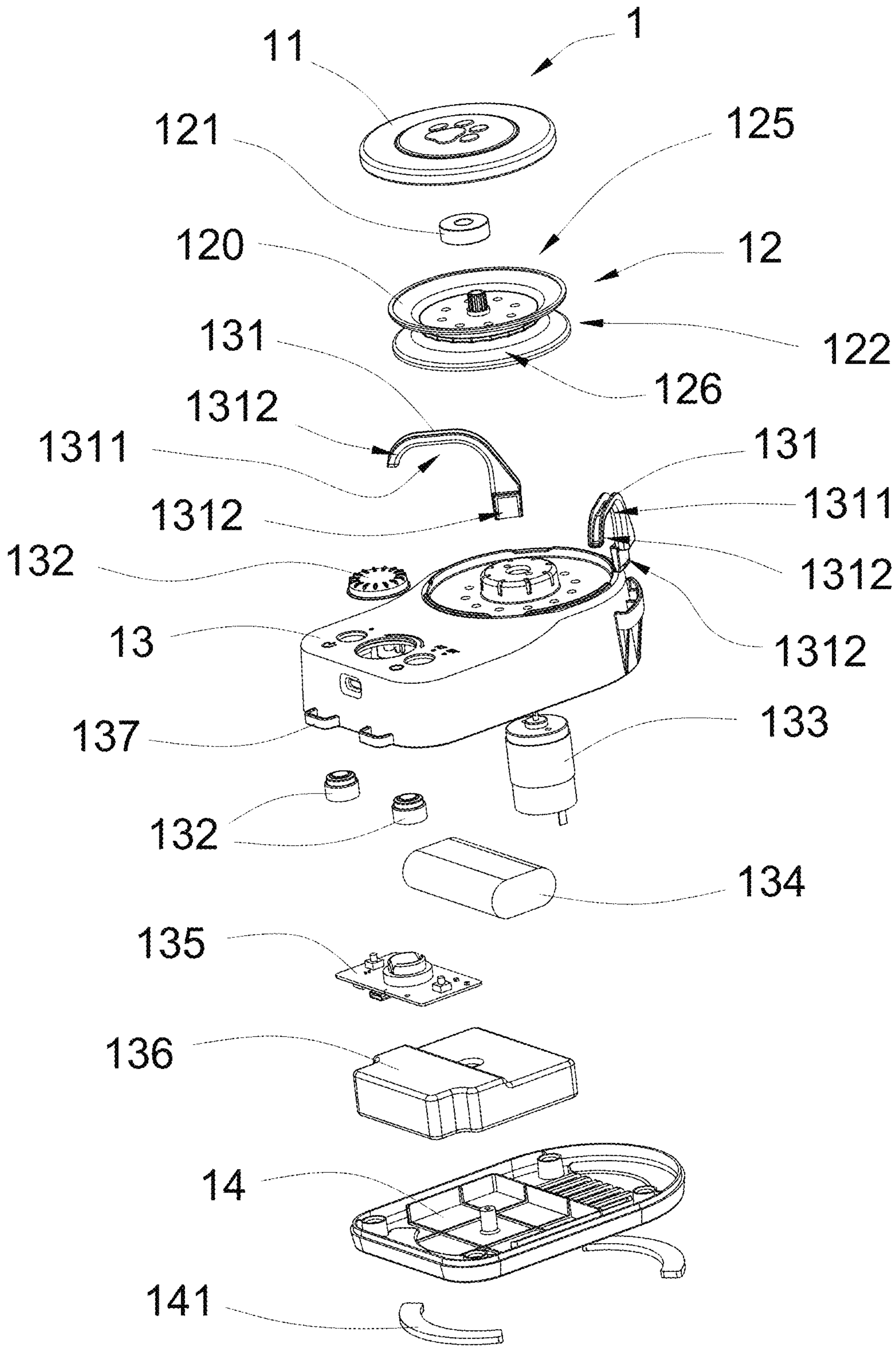
FIG. 5 is an exploded perspective view of a main driving station of the pet chasing toy according to the preferred embodiment of the present invention.
Figure 8:
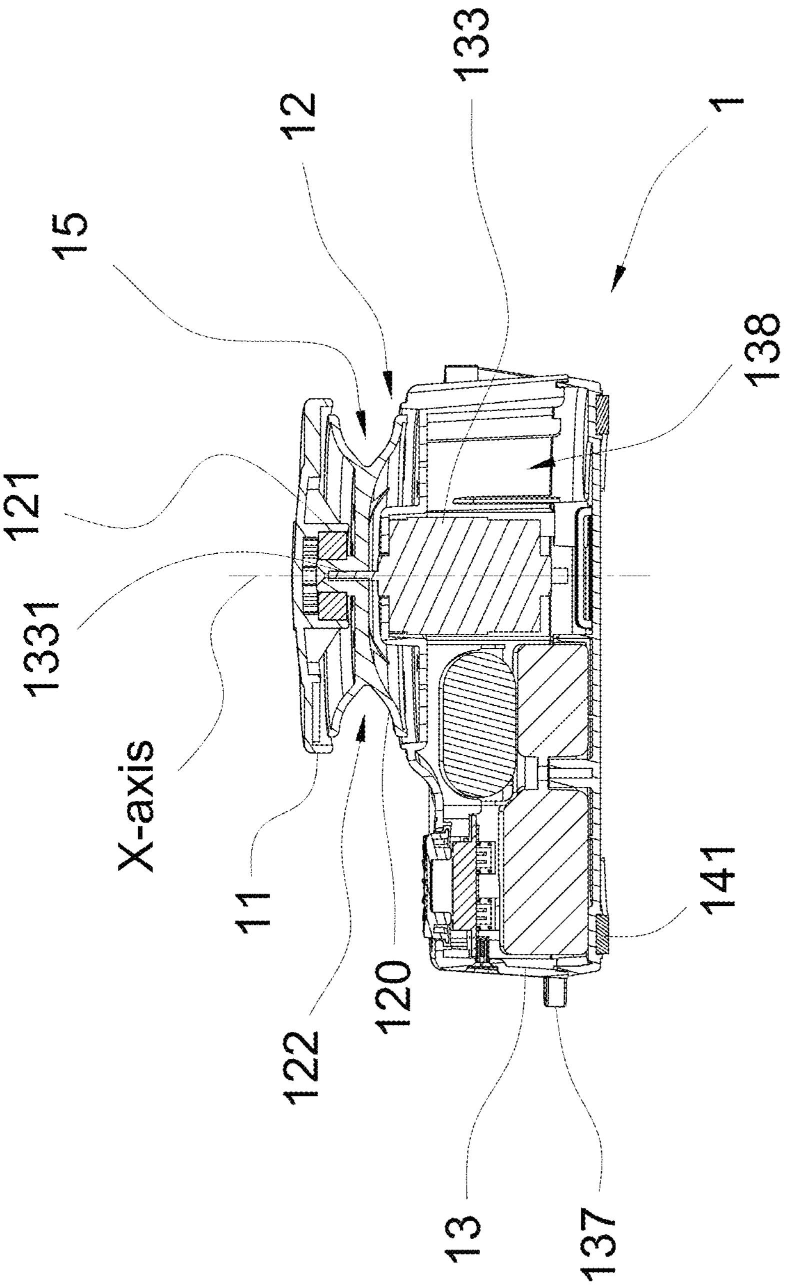
FIG. 8 is a sectional side view of the main driving station of the pet chasing toy according to the preferred embodiment of the present invention.

Referring to FIG. 5 and FIG. 8 of the drawings, the main driving station 1 may further comprise a main housing 13 having a receiving cavity 138, a top frame 11 connected to a top side of the main housing 13, and a bottom frame 14 connected to a bottom side of the main housing 13. The main driving rotor 12 may be coupled to the main housing 13 and securely sandwiched between the main housing 13 and the top frame 11. The bottom frame 14 may comprise at least one first frictional member 141 mounted on a bottom surface thereof to provide extra friction to the bottom frame 14 so as to substantially increase the friction between the main driving station 1 and the surface on which the main driving station 1 is disposed for preventing the main driving station 1 from slipping when the pet chasing toy of the present invention is in use. The first frictional member 141 may be configured from rubber or other suitable materials.

The main driving station 1 may further comprise the driving unit 133, and the main driving rotor 12 connected to the driving unit 133. Moreover, the main driving station 1 may further comprise a power unit 134 and a control circuitry 135 mounted in the receiving cavity 138, wherein the power unit 134 and the driving unit 133 may be electrically connected to the control circuitry 135, so that the control circuitry 135 may control the operation of the driving unit 133 and provide power thereto. The driving unit 133 may be configured as a motor for driving the main driving rotor 12 to rotate so as to drive the connecting cable 3 to move between the main driving station 1 and the satellite units 2.

In this preferred embodiment of the present invention, the power unit 134 may be configured as a rechargeable battery for providing power to the driving unit 133. As an alternative, the control circuitry 135 may be electrically connected to an external power source, such as an external AC power source, for supplying power to the driving unit 133. In this scenario, the power unit 133 may be omitted from the main driving station 1.

The main driving station 1 may further comprise a first weight unit 136 provided in the receiving cavity 138 for substantially increasing a weight of the main driving station 1. The purpose of the first weight unit 136 is to substantially increase a mechanical resistance of the main driving station 1 with respect to the ground so as to prevent the main driving station 1 from moving when in use. The first weight unit 136 may be configured from one or more materials which have a high density (such as beans, rocks, sands, etc.)

Figure 6:
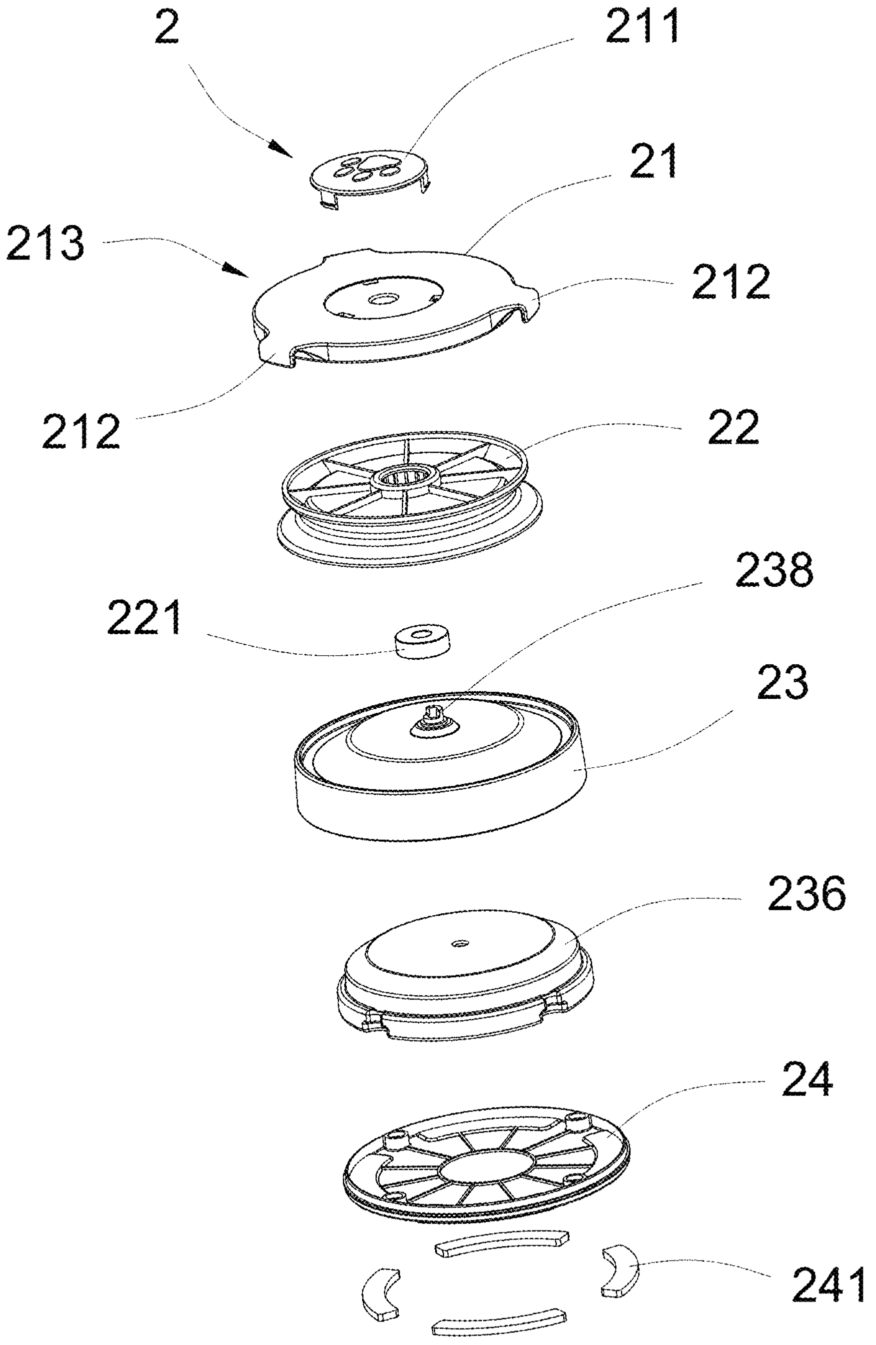
FIG. 6 is an exploded perspective view of a satellite unit of the pet chasing toy according to the preferred embodiment of the present invention.
Figure 7:
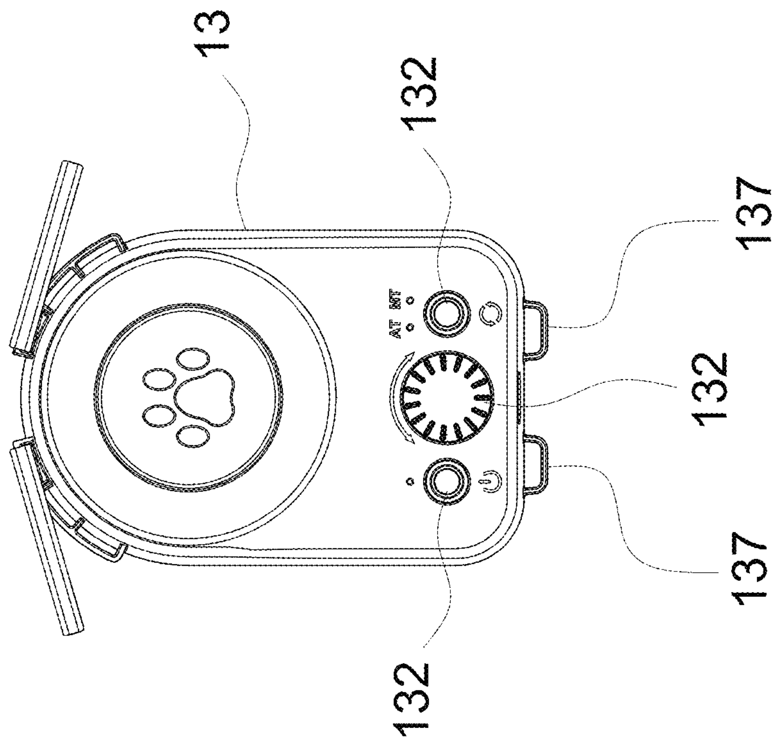
FIG. 7 is a top view of the satellite unit of the pet chasing toy according to the preferred embodiment of the present invention.

Referring to FIG. 6 to FIG. 8 of the drawings, the main driving station 1 may further comprise a plurality of anchor connectors 137 (but at least one) provided on the main housing 13 for allowing a user to connect the main housing 13 to an external object, such as a table, preferably through a string, for securing the position of the main driving station 1.

The main driving station 1 may further comprise a control switch 132 provided on the main housing 13 for allowing a user to control an operation of the pet chasing toy through operating on the control switch 132.

Referring to FIG. 7 to FIG. 10 of the drawings, the main driving rotor 12 may comprise a cylindrical wheel 120 having a groove 122 circumferentially and indently formed on the cylindrical member 120. The cylindrical wheel 120 may have a pair of outer wheel portion 125 and a middle support portion 126, wherein the connecting cable 3 may be arranged to accommodate in the groove 122 and frictionally engage with the outer surface of the middle support portion 126.

Figure 9:
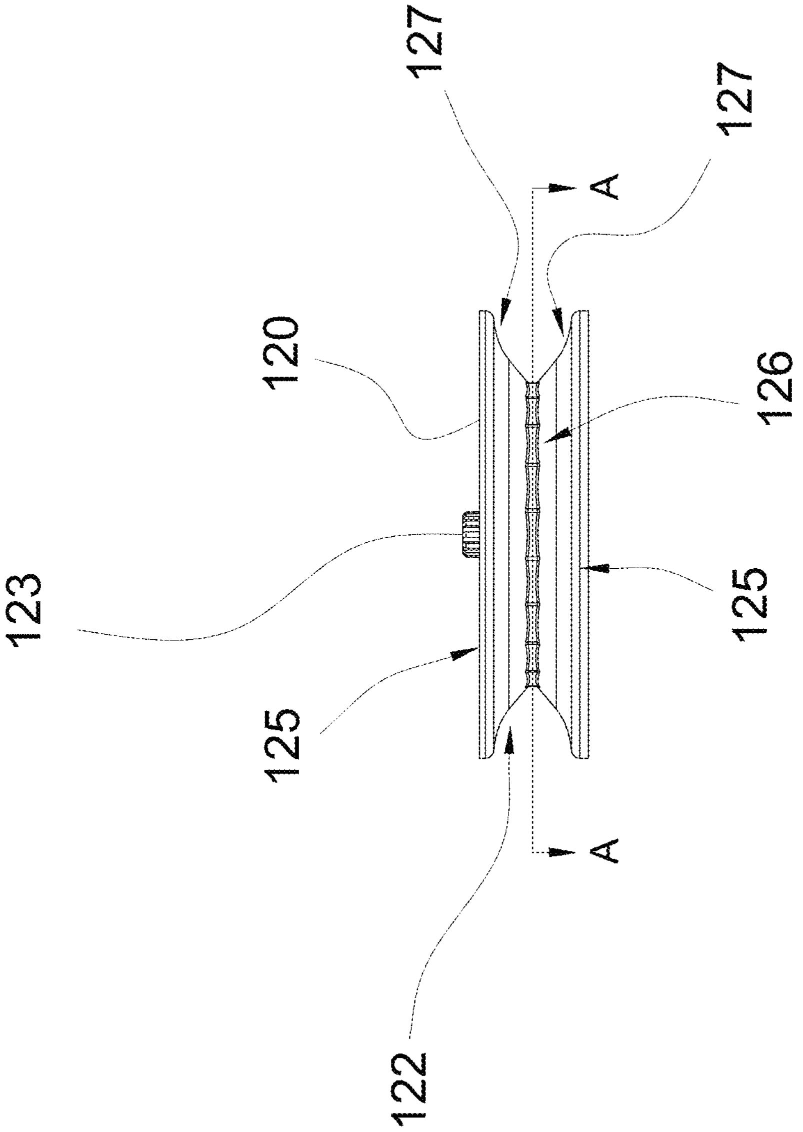
FIG. 9 is a side view of a main driving rotor of the main driving station of the pet chasing toy according to the preferred embodiment of the present invention.
Figure 10:
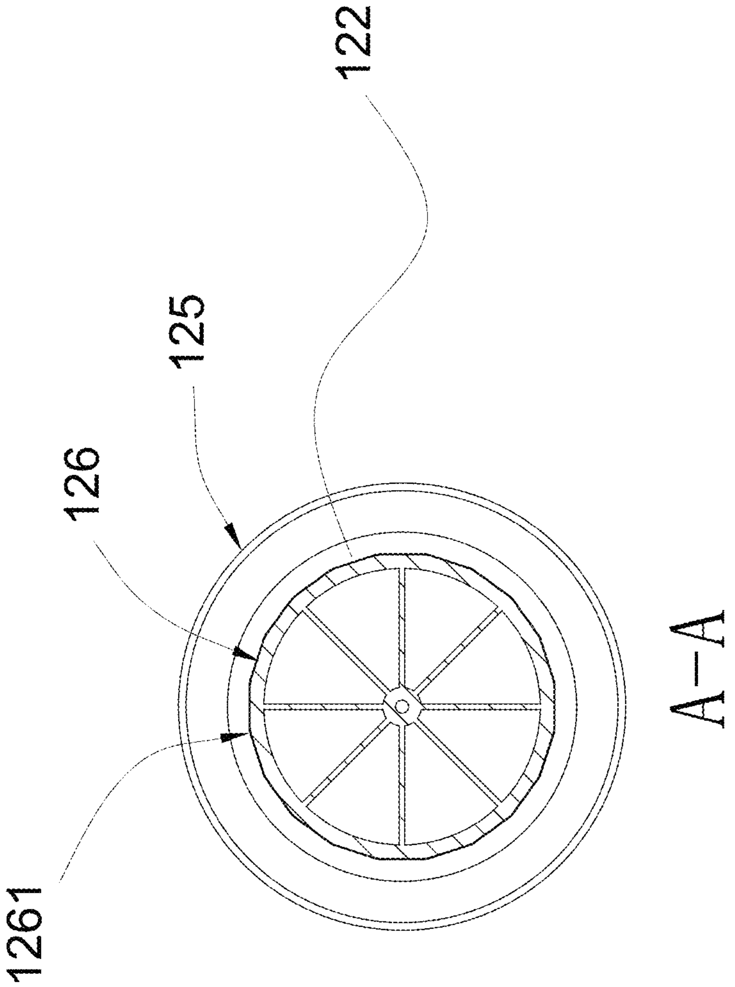
FIG. 10 is a cross-sectional view along A-A of FIG. 9.

The cylindrical wheel 120 may further have two connecting portions 127 extending between the outer wheel portions 125 and the middle support portion 126 respectively. Each of the two connecting portions 127 may have a circumference gradually decreasing from the corresponding outer wheel portion 125 toward the middle support portion 126. Thus, depending on the width of the middle support portion 126, the groove 122 of the cylindrical wheel 120 may have a generally "U" or "V" cross sectional shape, as shown in FIG. 9 of the drawings. Moreover, as shown in FIG. 10 of the drawings, an outer surface of the middle support portion 126 may be configured to be rough and have a plurality of ridges 1261 so as to define a polygonal cross sectional shape when viewed from the side of the cylindrical wheel 120. The purpose of this configuration is to ensure proper frictional engagement between the middle support portion 126 and the connecting cable 3. In other words, a relative movement between the middle support portion 126 and the connecting cable 3 may be minimized.

Referring to FIG. 8 to FIG. 9 of the drawings, the main driving rotor 12 may be connected to the driving unit 133 in a rotatably movable manner, through a driving shaft 1331. In other words, the main driving rotor 12 may be driven to rotate by the driving unit 133 about an X-axis which is parallel to a longitudinal direction of the driving shaft 1331. As an example, when the main driving station 1 is disposed on a ground surface, the driving shaft 1331 may be arranged to be substantially vertical with respect to the ground surface. Thus, a longitudinal direction of the driving shaft 1331 may also be vertical to the ground surface.

Furthermore, the main driving rotor 12 may further have a protrusion 123 protruding from the outer wheel portion 125 which is adjacent to the top frame 11, wherein the top frame 11 of the main driving station 1 may be rotatably mounted to the protrusion 123 so as to rotatably connect the top frame 11 to the main driving rotor 12, and preferably through a bearing 121. Thus, when the driving unit 133 is driving the main driving rotor 12 to rotate, the top frame 11 may also be driven to rotate by virtue of its being connected to the outer wheel portion 125 via the protrusion 123.

It is worth pointing out that due to the presence of the bearing 121, when an adequate external force is exerted to the top frame 11, the top frame 11 may cease to rotate while the main driving rotor 12 may continue rotating. In other words, a rotational movement of the top frame 11 may be stopped without interfering with the rotational movement of the main driving rotor 12.

Referring to FIG. 8 of the drawings, the main driving rotor 12 may further have a first opening 15 formed by the indention of the groove 122, wherein a diameter of the main driving rotor 12 is smaller than that of the main housing 13, so that when the main driving rotor 12 is mounted on the main housing 13, the main driving rotor 12 may be exposed out of the main housing 13 and visually observable from and unblocked by an exterior of the main housing 13. In other words, the first opening 15 may communicate the groove 122 to an exterior of the main driving rotor 12.

Referring to FIG. 6 to FIG. 7 of the drawings, the pet chasing toy may further comprise at least one first mounting bracket 131 detachably or non-detachably mounted on the main housing 13 so as to ensure that the connecting cable 3 may effectively engage to the main driving rotor 12 when the present invention is in use. As shown in FIG. 5 of the drawings, the first mounting bracket 131 may have two hook end portions 1312 and a main portion 1311 extending between the hook end portions 1312. The hook end portions 1312 may be arranged to extend to the main driving rotor 12 so as to secure the position of the connecting cable 3 in the groove 122.

In addition, referring to FIG. 6 of the drawings, each of the satellite units 2 may comprise a satellite body 23, a satellite top frame 21 supported by the satellite body 23, a satellite bottom frame 24 mounted on a bottom side of the satellite body 23, and a satellite driving wheel 22 rotatably mounted on the satellite body 23 through a satellite bearing 221 and a rotation shaft 238. According to the preferred embodiment of the present invention, the satellite top frame 21 may be rotatably mounted on the satellite driving wheel 22 through connecting to the rotation shaft 238. Thus, the satellite driving wheel 22 may be rotatably mounted between the satellite top frame 21 and the satellite body 23. The satellite body 23 may have a circular cross-sectional shape. However, other shapes are also possible.

Each of the satellite units 2 may further comprise a second mounting bracket 212 extending from the satellite top frame 21 for ensuring secure engagement between the connecting cable 3 and satellite driving wheel 22. This prevents the connecting cable 3 from detaching from the satellite driving wheel 22 when the present invention is in use. As shown in FIG. 5 of the drawings, the second mounting bracket 212 may form a hook-shaped or L-shaped structure extending from a peripheral edge 213 of the satellite top frame 21 toward a slot 222 (described below) of the satellite driving wheel 22. It is worth mentioning that each of the satellite units 2 may comprise a plurality of (but at least one) second mounting brackets 212 spacedly distributed along and extending from the peripheral edge 213 of the satellite top frame 21.

Each of the satellite units 2 may further comprise a decorative article 211 provided on the satellite top frame 21 for decoration purpose. Optionally, the decorative article 211 may also be provided on the top frame 11 of the main driving station 1.

Referring to FIG. 5 of the drawings, each of the satellite driving wheels 22 may have a slot 222 circumferentially and indently formed thereon. This structure defines the satellite driving wheel 22 to form a pair of satellite wheel portion 223 and a middle driven portion 224, wherein the connecting cable 3 may be arranged to accommodate in the slot 222 and frictionally engage with the outer surface of the middle driven portion 224. When the connecting cable 3 is driven to move by the main driving station 1, the satellite driving wheels 22 may be driven to rotate through frictional engagement between the satellite driving wheels 22 and the connecting cable 3.

Figure 15:
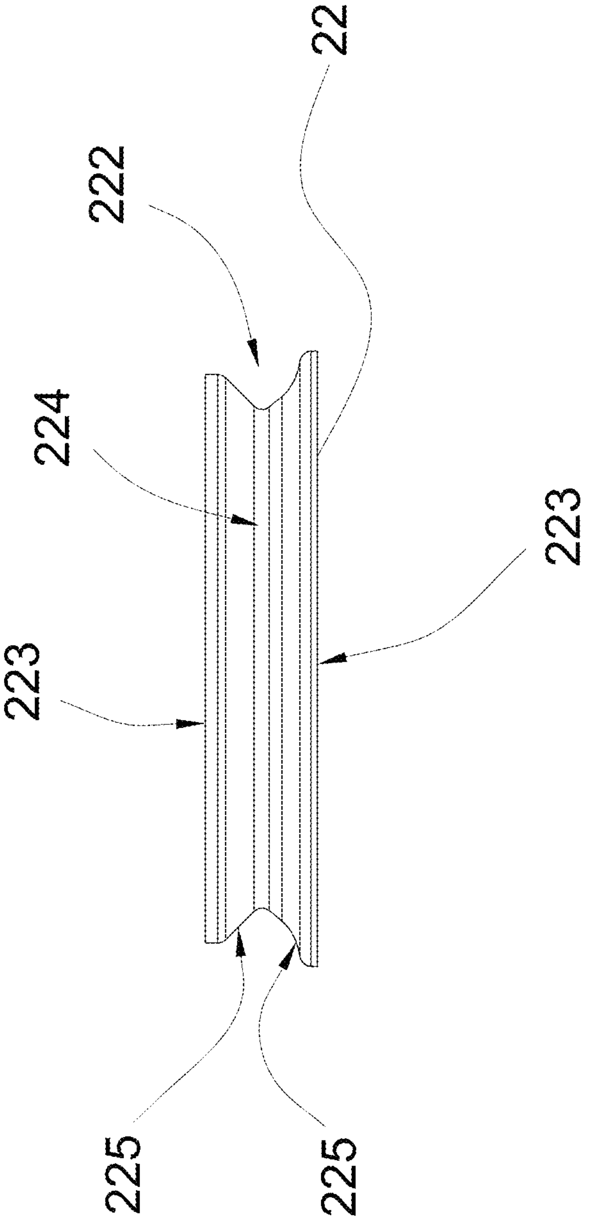
FIG. 15 is a side view of a satellite driving wheel of the satellite unit of the pet chasing toy according to the preferred embodiment of the present invention.

Each of the satellite driving wheels 22 may further have two extension portions 225 extending between the satellite wheel portions 223 and the middle driven portion 224 respectively. Each of the two extension portions 225 may have a circumference gradually decreasing from the corresponding satellite wheel portions 223 toward the middle driven portion 224. Thus, depending on the width of the middle driven portion 224, the slot 222 of the satellite wheel 220 may have a generally "U" or "V" cross sectional shape, as shown in FIG. 15 of the drawings. In this preferred embodiment, an external diameter of the cylindrical wheel 120 may be less than that of the satellite driving wheels 22 so as to maximize the efficiency of the driving performance of the cylindrical wheel 120.

Moreover, each of the satellite bottom frames 24 may comprise a second frictional member 241 mounted on a bottom surface thereof to provide extra friction to the satellite bottom frame 24 so as to substantially increase the friction between the satellite units 2 and the surface on which the satellite units 2 is disposed. The second frictional member 241 may be configured from rubber or other suitable materials.

Each of the satellite units 2 may further comprise a second weight unit 236 provided therein for substantially increasing a weight of the corresponding satellite unit 2. The purpose of the second weight units 236 is to substantially increase mechanical resistance of the satellite units 2 so as to prevent the satellite units 2 from moving when in use. Each of the second weight units 236 may be configured from one or more materials which have a high density (such as beans, rocks, sands, etc.). In this preferred embodiment of the present invention, a weight of each of the second weight unit 236 may be identical and larger than that of the first weight unit 136.

Figure 11:
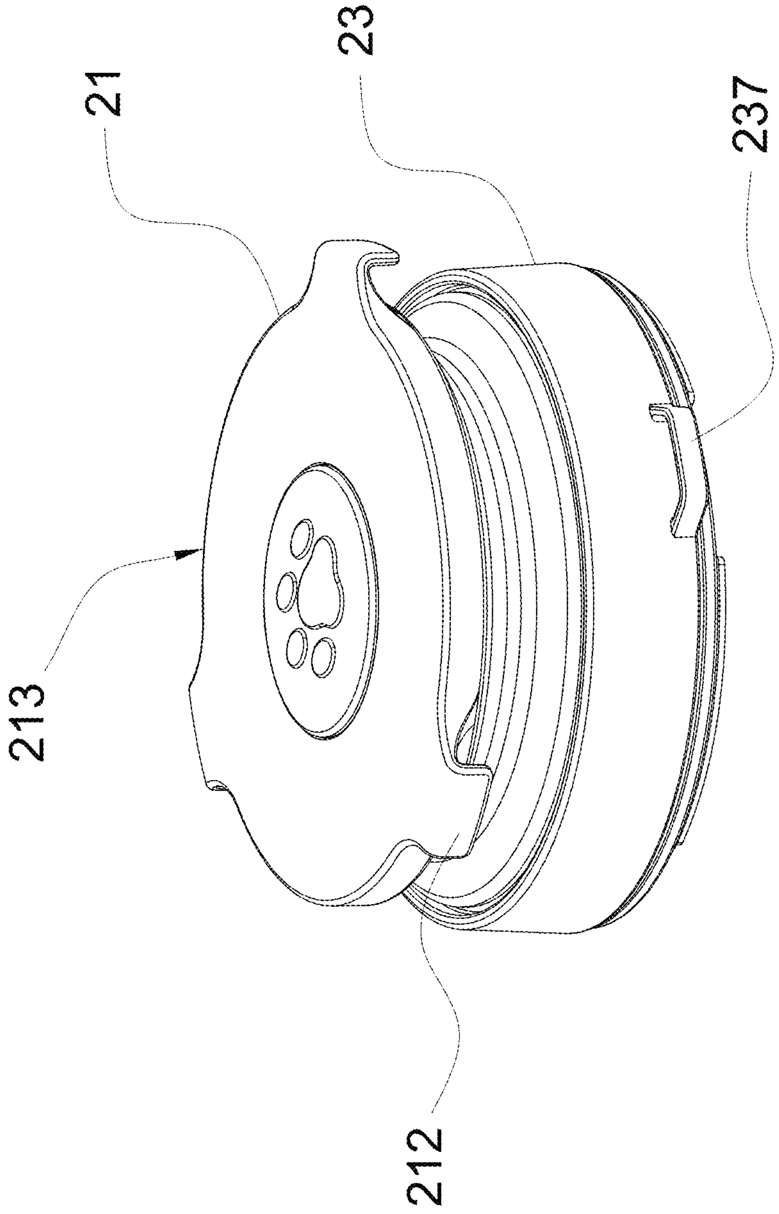
FIG. 11 is a perspective view of the satellite unit of the pet chasing toy according to the preferred embodiment of the present invention.
Figure 12:
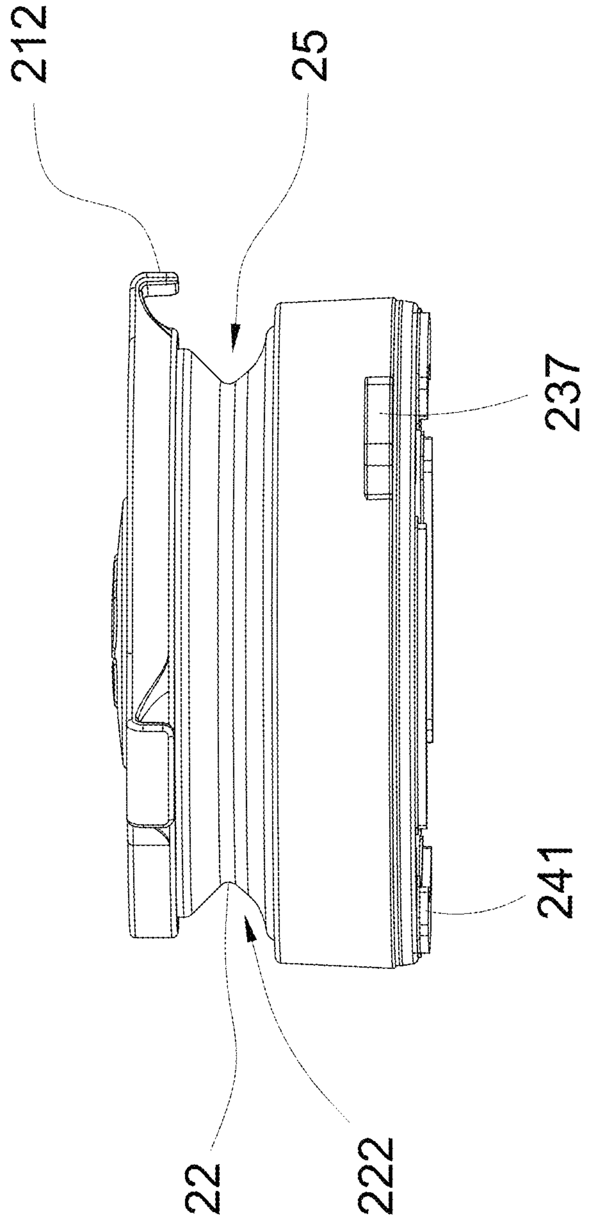
FIG. 12 is a side view of the satellite unit of the pet chasing toy according to the preferred embodiment of the present invention.

Referring to FIG. 11 to FIG. 12 of the drawings, each of the satellite units 2 may further comprise a plurality of anchor connectors 237 (but at least one) provided on the satellite body 23 for allowing a user to connect the satellite unit 2 to an external object preferably through a string, for securing the position of the satellite unit 2.

Referring to FIG. 11 to FIG. 15 of the drawings, each of the satellite units 2 may further have a second opening 25 communicating with the slot 222, wherein a diameter of the satellite driving wheel 22 is smaller than that of the satellite body 23, so that when the satellite driving wheel 22 is mounted on the satellite body 23, the satellite driving wheel 22 may be visually observable from and exposed to an exterior of the corresponding satellite unit 2. In other words, the second opening 25 may communicate the slot 222 to an exterior of the corresponding satellite driving wheel 22. Moreover, a diameter of the satellite driving wheel 22 is smaller than that of the satellite top frame 21.

Figure 13:
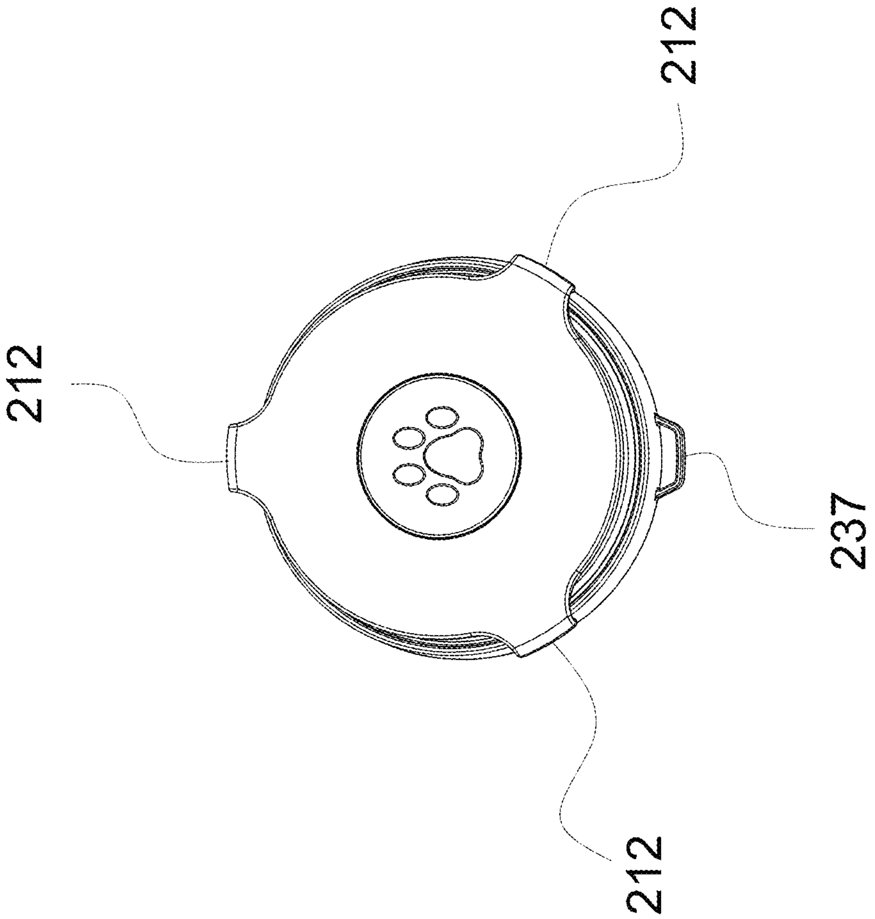
FIG. 13 is a top view of the satellite unit of the pet chasing toy according to the preferred embodiment of the present invention.
Figure 14:
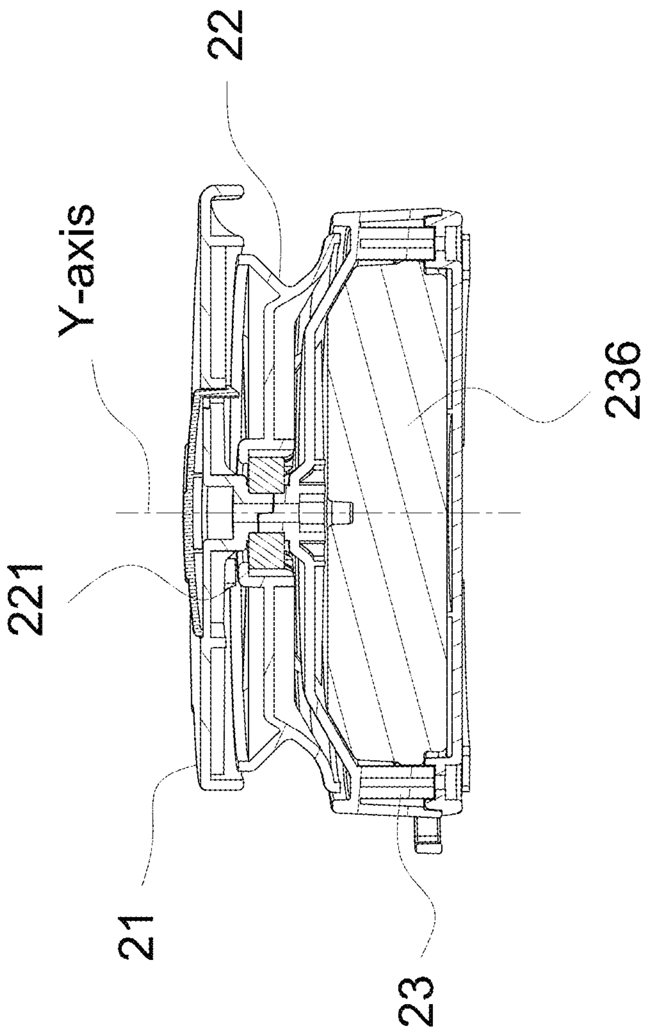
FIG. 14 is a sectional side view of the satellite unit of the pet chasing toy according to the preferred embodiment of the present invention.

Referring to FIG. 13 of the drawings, when the satellite unit 2 is disposed on a ground surface, the satellite driving wheel 22 may rotate about a Y-axis illustrated in FIG. 13 of the drawings. The Y-axis may be substantially vertical with respect to the ground surface. The X-axis and the Y-axis may be substantially parallel.

Figure 3:
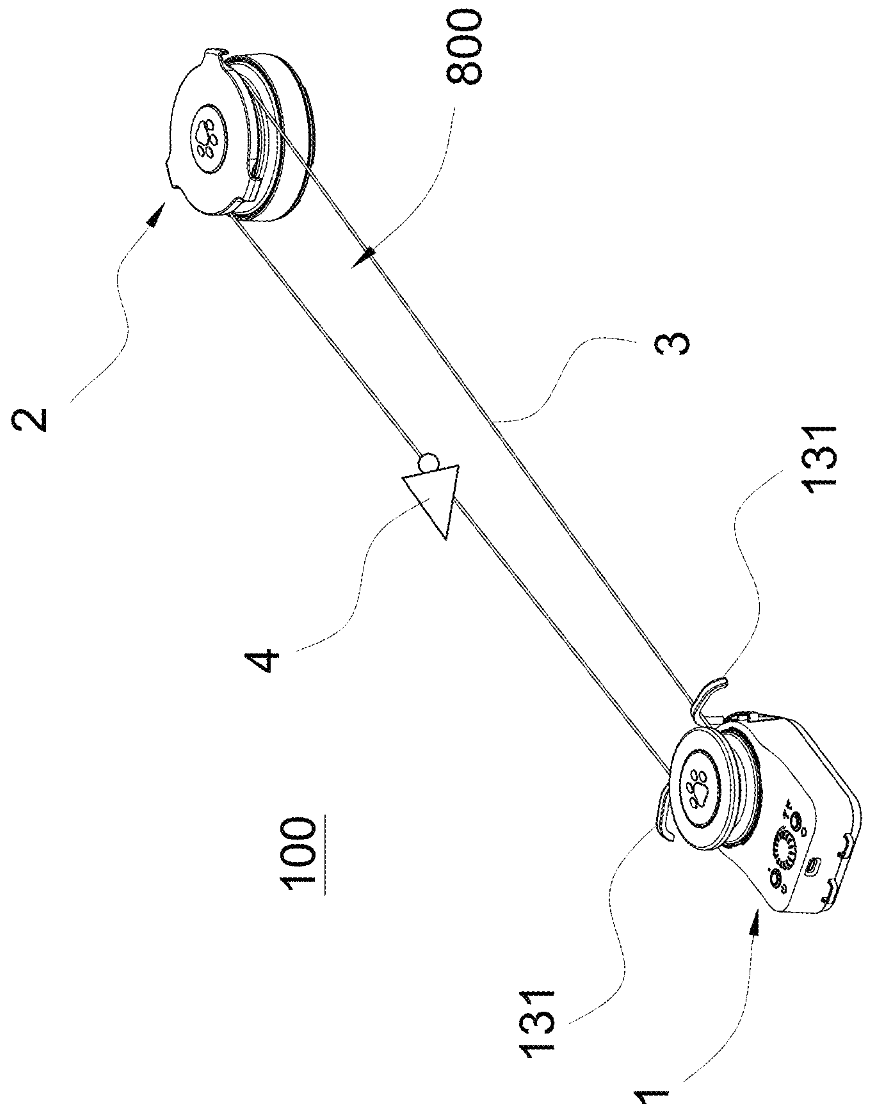
FIG. 3 is a schematic diagram of a pet chasing toy according to the preferred embodiment of the present invention, illustrating that a main driving station and one satellite unit may be positioned to form a simple chasing configuration.
Figure 4:
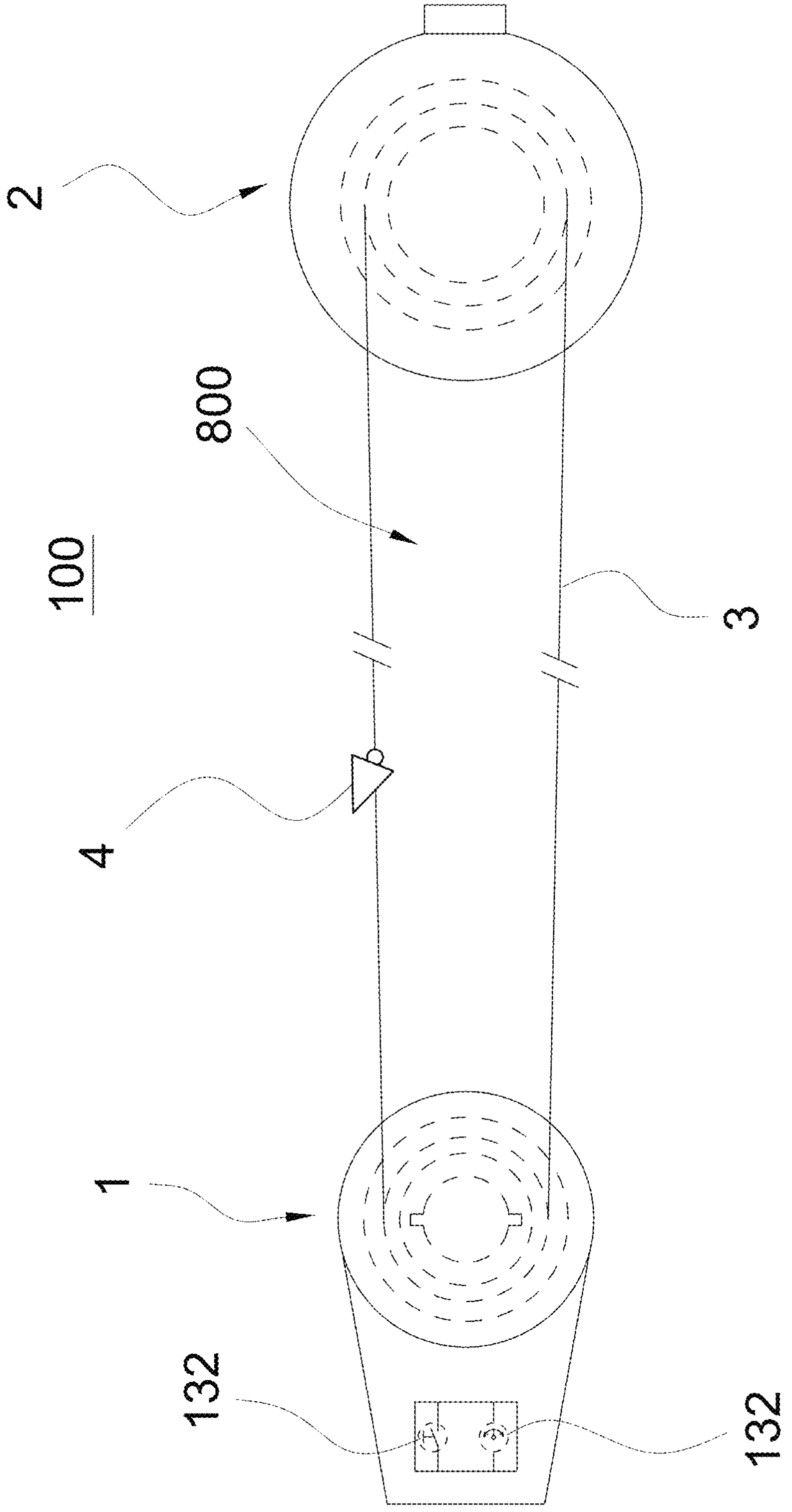
FIG. 4 is another schematic diagram of a pet chasing toy according to the preferred embodiment of the present invention, illustrating that a main driving station and one satellite unit may be positioned to form a simple chasing configuration.

The operation of the present invention is as follows: referring to FIG. 1 to FIG. 3 of the drawings, the pet cashing toy 100 may comprise a main driving station 1 and several satellite units 2 disposed spacedly apart from each other. The connecting cable 3 may extend between the main driving station 1 and the satellite units 2 through engaging in the groove 122 of the main driving rotor 12 and the slots 222 of the satellite driving wheels 22. The connecting cable 3 may be prevented from detaching from the main driving rotor 12 and the slots 222 of the satellite driving wheels 22 by the first mounting bracket 131 and the second mounting brackets 212.

When the main driving unit 1 is activated, the main driving rotor 12 is driven to rotate so as to drive the connecting cable 3 to move through the main driving station 1 and the satellite units 2 in a predetermined sequence. At the same time, the visual object 4 may travel along with the connecting cable 3. The movement of the visual object 4 may imitate a prey and therefore stimulate chasing by the pet.

The present invention, while illustrated and described in terms of a preferred embodiment and several alternatives, is not limited to the particular description contained in this specification. Additional alternative or equivalent components could also be used to practice the present invention.

What is claimed is:

1. A pet chasing toy, comprising:

a main driving station comprising a driving unit and a main driving rotor, wherein the driving unit is arranged to drive the main driving rotor to rotate, the main driving station further comprising a main housing having a receiving cavity, a top frame connected to a top side of the main housing, the main driving rotor being coupled to the main housing and securely sandwiched between the main housing and the top frame, the main driving rotor comprising a cylindrical wheel having a groove circumferentially and indently formed on the cylindrical member, the cylindrical wheel having a pair of outer wheel portions, a middle support portion, and two connecting portions extending between the outer wheel portions and the middle support portion respectively, each of the two connecting portions having a circumference gradually decreasing from the corresponding outer wheel portion toward the middle support portion;

at least one satellite unit which is arranged to be disposed at a distance from the main driving station, the satellite unit comprising a satellite driving wheel;

a connecting cable extending between the main driving rotor and the satellite driving wheel, and being arranged to accommodate in the groove and frictionally engage with an outer surface of the middle support portion of the cylindrical wheel; and a visual object attached on the connecting cable, wherein the driving unit is arranged to drive the main driving rotor to rotate so as to drive the connecting cable and the visual object to repetitively move between the main driving rotor and the satellite driving wheel, wherein an outer surface of the middle support portion has a plurality of ridges so as to define a polygonal cross sectional shape for ensuring proper frictional engagement between the middle support portion and the connecting cable.

2. The pet chasing toy, as recited in claim 1, wherein the main driving rotor further has a protrusion protruding from the outer wheel portion which is adjacent to the top frame, wherein the top frame of the main driving station is rotatably mounted to the protrusion through a bearing, such that when the driving unit drives the main driving rotor to rotate, the top frame is also driven to rotate, and when a predetermined external force is exerted to the top frame, the top frame is brought to stop while the main driving rotor is arranged to continue to rotate.

3. The pet chasing toy, as recited in claim 2, wherein the main driving rotor is rotatably mounted on the main housing in such a manner that the main driving rotor is arranged to be exposed out of the main housing and visually observable from and unblocked by an exterior of the main housing.

4. The pet chasing toy, as recited in claim 3, wherein the main driving station further comprises a first mounting bracket provided on the main housing and extend toward the groove so as to prevent the connecting cable from detaching from the main driving rotor when the main driving rotor is driven to rotate.

5. The pet chasing toy, as recited in claim 4, wherein the satellite unit comprises a satellite body, a satellite top frame supported by the satellite body, a satellite bottom frame mounted on a bottom side of the satellite body, and a satellite driving wheel rotatably mounted on the satellite body.

6. The pet chasing toy, as recited in claim 4, further comprising a plurality of satellite units positioned spacedly apart from the main driving station, wherein the connecting cable extends through the main driving station and the satellite units to form a chasing loop.

7. The pet chasing toy, as recited in claim 5, wherein the satellite unit further comprises a second mounting bracket extending from the satellite top frame for ensuring secure engagement between the connecting cable and corresponding satellite driving wheel.

8. The pet chasing toy, as recited in claim 7, wherein the satellite driving wheel has a slot circumferentially and indently formed thereon, the satellite driving wheel having a pair of satellite wheel portions and a middle driven portion, wherein the connecting cable is arranged to accommodate in the slot and frictionally engage with the outer surface of the middle driven portion.

9. The pet chasing toy, as recited in claim 8, wherein the satellite driving wheel further has two extension portions extending between the satellite wheel portions and the middle driven portion respectively, each of the two extension portions having a circumference gradually decreasing from the corresponding satellite wheel portions toward the middle driven portion.

10. The pet chasing toy, as recited in claim 9, wherein each of the satellite driving wheel is rotatably mounted on the satellite body in such a manner that the satellite driving wheel is arranged to be exposed out of the satellite body and visually observable from and unblocked by an exterior of the satellite body.

11. The pet chasing toy, as recited in claim 10, further comprising a plurality of satellite units positioned spacedly apart from the main driving station, wherein the connecting cable extends through the main driving station and the satellite units to form a chasing loop.

* * * * *